Jan. 19, 1960  R. F. OATES ET AL  2,922,106
METHOD AND APPARATUS FOR TESTING A RECORD ELEMENT
Filed Aug. 1, 1956  7 Sheets-Sheet 1

RECORDING HEAD CURRENT

*Fig. 1ᵃ*

VOLTAGE ACROSS PLAY-BACK HEAD

INVENTORS,
ROBERT F. OATES
and HENRY W. BUCHMEYER

BY *Stevens, Davis, Miller & Mosher*
ATTORNEYS

Fig. 1c

SIGNAL LEVEL DETECTOR INPUT

Fig. 1d

OUTPUT OF SIGNAL LEVEL DETECTOR

Fig. 1e

INPUT TO AGC AMPLIFIERS

INVENTORS
ROBERT F. OATES
and HENRY W. BUCHMEYER

Jan. 19, 1960 R. F. OATES ET AL 2,922,106
METHOD AND APPARATUS FOR TESTING A RECORD ELEMENT
Filed Aug. 1, 1956 7 Sheets-Sheet 3

*Fig. 1$^f$*

OUTPUT OF AGC AMPLIFIERS

INVENTORS
ROBERT F. OATES
and HENRY W. BUCHMEYER

BY Stevens, Davis, Miller & Mosher
ATTORNEYS

Jan. 19, 1960   R. F. OATES ET AL   2,922,106
METHOD AND APPARATUS FOR TESTING A RECORD ELEMENT
Filed Aug. 1, 1956                                              7 Sheets-Sheet 4

INVENTORS
ROBERT F. OATES
and HENRY W. BUCHMEYER

BY *Stevens, Davis, Miller & Mosher*
ATTORNEYS

INVENTORS
ROBERT F. OATES
and HENRY W. BUCHMEYER

BY Stevens, Davis, Miller & Mosher
ATTORNEYS

Jan. 19, 1960    R. F. OATES ET AL    2,922,106
METHOD AND APPARATUS FOR TESTING A RECORD ELEMENT
Filed Aug. 1, 1956    7 Sheets-Sheet 7

INVENTORS
ROBERT F. OATES
and HENRY W. BUCHMEYER

BY Stevens, Davis, Miller & Mosher
ATTORNEYS

United States Patent Office 2,922,106
Patented Jan. 19, 1960

2,922,106

METHOD AND APPARATUS FOR TESTING A RECORD ELEMENT

Robert F. Oates and Henry W. Buchmeyer, Dallas, Tex., assignors to Texas Instruments, Incorporated, Dallas, Tex., a corporation of Delaware Application August 1, 1956, Serial No. 601,517

1 Claim. (Cl. 324—34)

The present invention relates to a test apparatus for use in determining the uniformity of a magnetically coated record element and also the presence of any foreign particles in the magnetic coating which might have a detrimental effect upon the operation of a magnetic recorder in which the record element is to be used and to a method of testing a record element.

Before using magnetically coated record elements, such as tapes, bands, discs, drums, etc., it is necessary that the elements first be examined and tested to determine the uniformity of the coating so that knowledge can be gained concerning the areas of the record which are not uniform. Non-uniformity in the element will naturally result in unfaithful reproduction of signals recorded in these non-uniform areas. The non-uniformly coated areas can be marked or somehow noted so that when the record element is used, the non-uniform areas will not introduce unknown distortions.

It is accordingly an object of the present invention to provide an apparatus which can be used to test magnetically coated recording elements in order to determine their general condition as regards uniformity of the magnetic coating and also to determine the surface character of the element in great detail to reveal any inclusions of foreign matter or discrete areas of the coating that are of poor magnetic characteristics. The apparatus will operate successfully to detect such faults as above described where the defective areas have a diameter in the order of at least about 0.025 inch. Although the loss of signal from defects such as these will be of relatively short duration, usually in the order of 15 to 25 cycles of a 4,000 cycle-per-second signal frequency, the momentary loss of signal resulting from these defects is of sufficient duration as to give erroneous indication upon playback.

For convenience, a momentary loss of signal will be hereinafter referred to as drop-out and the circuits of the test apparatus which are used to detect momentary losses of signal on a magnetically coated recording medium will be hereinafter referred to as drop-out circuits. Drop-outs in a magnetic recording medium may be due to entire loss of a signal or on the other hand result in only a partial loss of a signal. The severity of a drop-out is normally defined as the ratio of signal amplitude during the drop-out to the signal level just prior to the occurrence of the drop-out. This ratio is usually expressed in decibels (db).

It is a further object of the present invention to provide a test apparatus which will efficiently and expediently determine the general condition of a magnetically coated recording element and also determine the places on the magnetic recording element which are defective by virtue of inclusion of foreign matter in the coating or a lack of sufficient magnetic coating.

Other objects and advantages of the present invention will become readily apparent from the following detailed description of the invention when taken in conjunction with the appended drawings in which:

The mechanical portion of the test apparatus is illustrated in Figures 3 to 8 and includes a turntable 10 adapted to receive for test purposes a magnetically coated recording element such as a disc 11. The turntable 10 is supported by a shaft 12, the base of which is received in a suitable housing 13 with the bottom of the shaft 12 being supported by a ball 14. The housing 13 is attached to the undersurface of a table 15 and a ball bearing 16 is provided to reduce friction on the shaft 12 in its passage through the table 15. The turntable 10 is peripherally driven by means of a roller 17 driven by a motor 18 supported on the table 15. A pair of lead screws 20 threaded for about half their length, are supported on table 15 by means of brackets 21 on opposite sides of the shaft 12. Each lead screw 20 has a miter gear 22 fixed at one end in meshing engagement with a large miter gear 23 fixed to the shaft 12. By means of the arrangement described, operation of the motor 18 will drive turntable 10 via roller 17 and rotate shaft 12. The two lead screws 20 will be driven via the miter gears 22 and 23.

Mounted slidably on each lead screw 20 is an unthreaded sleeve 25 which has a cutout portion 26 adjacent its forward end. Pivotally supported by the sleeve 25 is a threaded half-nut 27 adapted to be received in the cutout portion 26 and engage with lead screw 20. With the half-nuts 27 received in the cutout portion 26, rotation of lead screws 20 will advance the sleeves 25 toward each other at the same rate. A rod 30 extends parallel with the lead screws 20, spaced therefrom, and is supported at its ends by suitable brackets 31. The rear end of each sleeve 25 is fixed with the right angle corner of the base of a right triangular plate 32 which has its other base corner, secured to a collar 33 slidably received on the rod 30. The top corner of the triangular plate 32 is bifurcated and receives one end of an arm 34. Pin 35 pivotally connects the received end of arm 34 with the triangular plate 32. The other end of arm 34 extends radially over the turntable 10 and disc 11 centered vertically over lead screw 20 and has fixed to it a suitable play-back head 36 or recording head 37. The arm 34 shown to the left in Figure 3 holds playback head 36 and the arm 34 shown to the right in Figure 3 holds recording head 37. Closely spaced from recording head 37 by means of a short arm 38 is an erasing head 39.

The pitch of the lead screws is such that the recording track spiral preferably covers about one-half of the record area. The lead screws are engaged with the half nuts at a predetermined point in the rotation of the turntable so that if a test is to be repeated, the test signal can be recorded again in the same recording track. Stops 8 of any type which permits adjustment are arranged on the ends of lead screws 20 remote from the gear 23. These stops establish the starting position for magnetic heads. The reproducing head 36, naturally, starts a little farther out on the record to be on the same recording track on which the signal is recorded by the recording head 37 when that recorded signal reaches head 36 after 180° turntable rotation. A switch, such as a microswitch, is positioned to be contacted or actuated by a plate 32 to stop the turntable by cutting off the motor 17 after the completion of a record test.

Figures 3, 4:
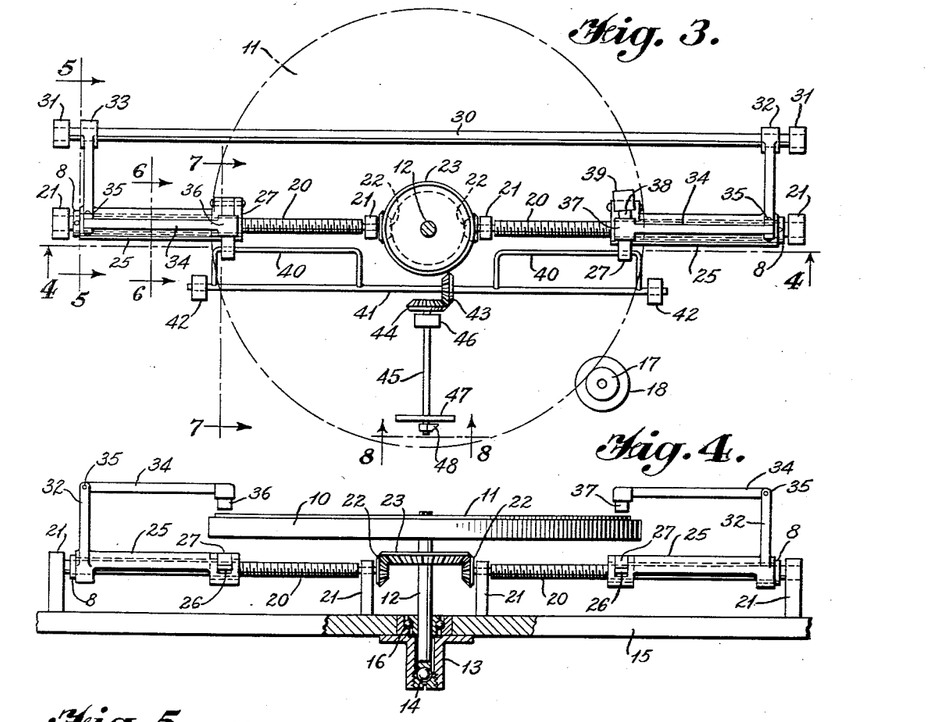
Figure 3 is a plan view of the mechanical portion of the test apparatus.
Figure 4 is a view in section taken along line 4—4 of Figure 3.
Figures 5, 6:
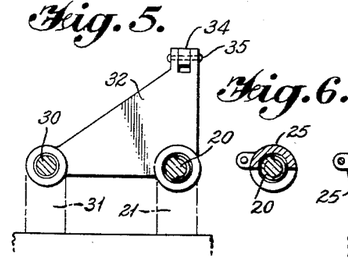
Figure 5 is a view in section taken along line 5—5 of Figure 3.
Figure 6 is a view in section taken along line 6—6 of Figure 3.

In the operation of the apparatus described rotation of the turntable 10 will automatically advance the recording head 37 and the pick-up head 36 from their starting positions as outlined, radially inwardly of the disc 11 along the same diameter and at the same rate. The disc 11 rotates in a clockwise direction as shown in Figure 3 with the purpose being that the recording head 37 will impress signals upon disc 11 which will be picked up when the impressed areas arrive at the play-back head 36. Continued rotation of the disc 11 will bring the signal areas beneath the erasing head 39 which will act to eradicate them. In the use of the apparatus, a known signal is continuously recorded on the disc 11, continuously played back via head 36 in order to analyze it and detect faults in the magnetic coating and continuously erase by head 39. The operation normally continues until a plate 32 actuates the switch as described above.

Figures 7, 8:
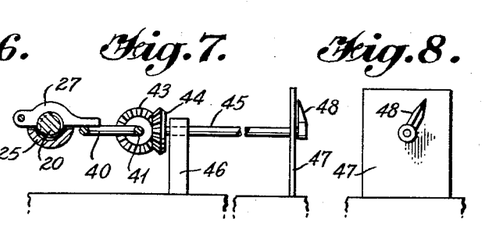
Figure 7 is a view in section taken along line 7—7 of Figure 3.
Figure 8 is a view in section taken along line 8—8 of Figure 3.

There is also shown in detail in Figures 3, 7 and 8, an arrangement for starting the calculated advance of the recording and playback heads which also can be used to release the half-nuts 21 from the lead screws 20. As shown, a pair of U-shaped bars 40 are positioned to engage a projecting part of the half-nut 27. Each U-shaped bar 40 is integral with a rod 41 which is bearing supported at its ends by brackets 42. A miter gear 43 is fixed on the rod 41 and meshes with a miter gear 44 fixed to the end of a rod 45. This rod 45 is bearing supported by bracket 46 and plate 47. The other end of rod 45 has attached to it a pointer arm 48 which can be actuated to engage the half-nuts 27 and the lead screws 20 upon starting the operation or to disengage them.

Figure 1A:
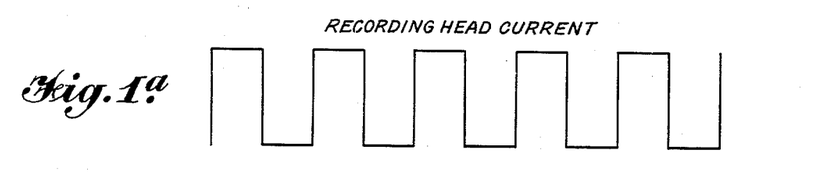
Figures 1a to 1o are plots of waveforms appearing in the circuitry of the test apparatus.
Figure 1B:
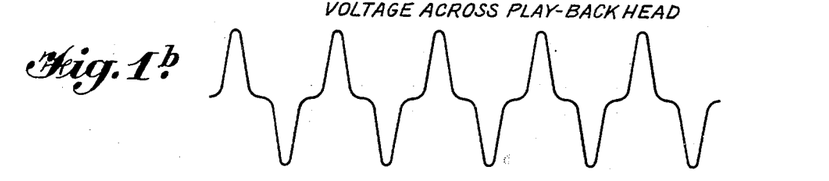

The playback and recorder heads 36 and 37 respectively are of identical construction. In the operation of the apparatus, a 4,000 c.p.s. square wave of current of approximately 3 milliamperes peak to peak, is passed through the recording head 37 and magnetizes the surface of the disc 11 as it passes thereunder. A plot of recording current versus time is shown in Figure 1a. Approximately 180 mechanical degrees after a portion of the disc 11 has pasesd under the recording head 37, it will pass under the pickup head 36 and will induce a voltage in the windings of the pickup head. A plot of voltage induced in the pick-up head 36 versus time is shown in Figure 1b.

Figure 1C:
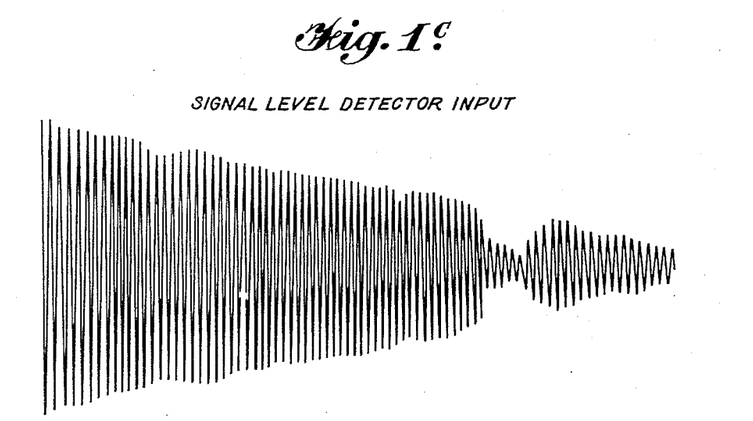
Figure 1D:
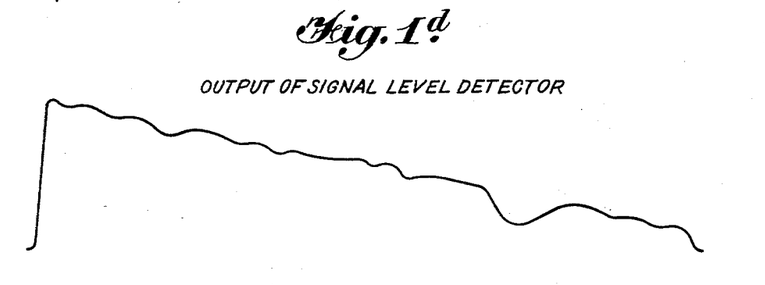
Figure 2A:
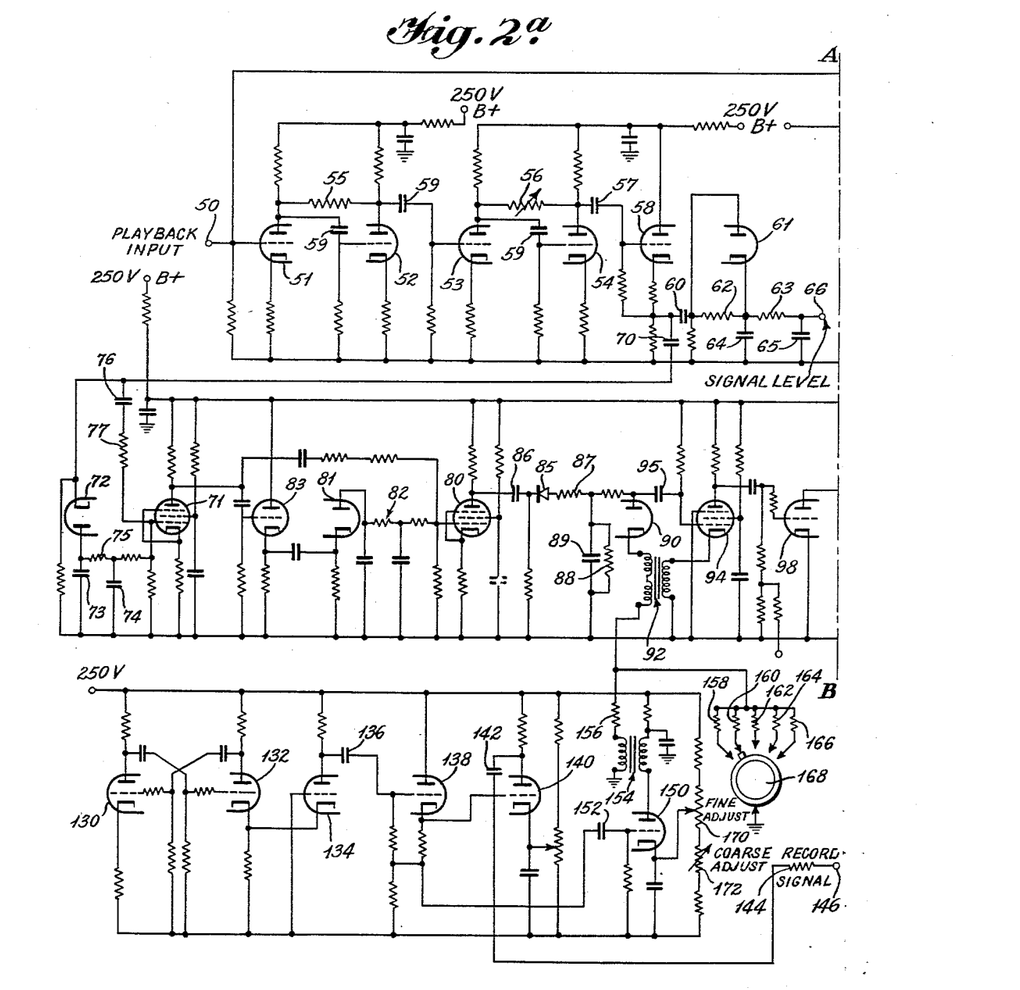
Figures 2a and 2b are schematic representations of the circuitry which is employed in the test apparatus.
Figure 2B:
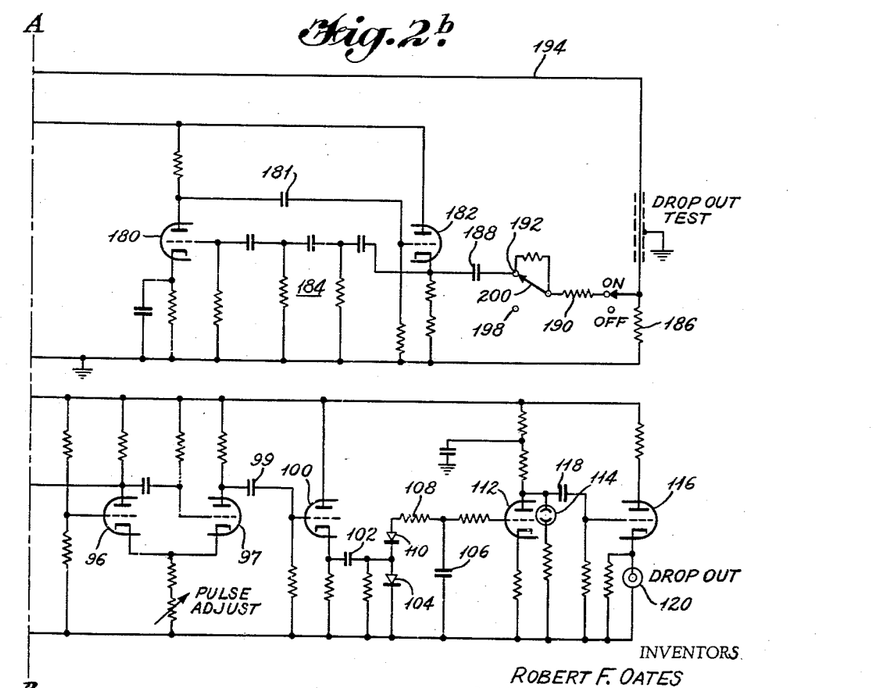

The circuitry employed to handle the play-back voltages and to test these voltages to determine defects and faults in the recording element 11 are illustrated in Figures 2a and 2b. The voltage across the playback head 36 is usually quite small and hence it is desirable to increase the signal voltage level. The playback input is applied at terminal 50 to a two-stage feedback-pair amplifier made up of triodes 51, 52, 53 and 54. A B+ voltage is applied to the plates of these four tubes as indicated in the drawing. The four tubes are connected with the usual adjuncts such as resistors, condensers, etc., with resistors 55 and 56 functioning in a feed back capacity. The output from each of the four tubes is capacitive coupled via condensers 59 to the next tube. Since the general circuitry is conventional, it is not felt necessary to provide an element for element description. The gain of the four amplifiers at 4,000 c.p.s. is approximately 76 decibels. The output from the amplifier is from the plate of the tube 54 and is coupled by condenser 57 to a triode 58 acting as a modified cathode follower. The cathode follower provides a low impedance input for a signal level detector circuit and also isolates the playback amplifier from any loading effects. The signal input to the signal level detector is by means of condenser 60. The input signal is rectified in diode 61 and passed through an RC filter consisting of resistances 62 and 63 and condensers 64 and 65. The output voltage developed across the condenser 65, in shunt with the input resistance of the recorder amplifier, will correspond to the modulation envelope of the playback signal. Figures 1c and 1d illustrate plots of the voltages at the input to the signal level detector and the output of the detector and filter versus time. It should be noted that the time constant of the filter network is sufficiently large so that high frequency modulations are suppressed. The output of the signal level detector is at terminal 66 and is fed to a D.C. amplifier of the suitable recorder such as the recorder produced commercially by the Brush Development Company and known in the art as the "Brush Recorder." The output from terminal 66 is fed via the D.C. amplifier of the "Brush Recorder" to one pen motor. As will be evident, the recorder will give an indication of the general condition of the magnetic recording medium.

The signal level circuits contain large time constants so that only long time variations in the playback signal can be detected. In order to determine the inclusion of foreign matter in the magnetic coating of the recording element or the absence in small discrete areas of magnetic coating it is necessary to select circuitry characterized by a higher frequency response. The remainder of the circuitry illustrated in Figures 2a and 2b is primarily for the purpose of detecting temporary decreases or dropouts in the ambient signal level from the playback head and if these are of sufficient importance to make a permanent record of them. There are in these circumstances what can be considered allowable and non-allowable dropouts of the signal. It is the aim of the present invention to detect the various dropouts and to classify them and make a permanent record of those classed as nonallowable.

The functions described are performed by the dropout circuitry now to be described. The dropout circuit employs the same playback amplifier and cathode follower that were used in the signal level circuits. The output of the cathode follower 58 is coupled by capacitor 70 to the grid of a first automatic gain controlled amplifier tube 71 via condenser 76 and resistor 77 and in parallel through a rectifier 72 and RC filter network composed of capacitors 73 and 74 and resistor 75. The resultant signal is applied as a negative bias to the grid of tube 71 which functions as a remote cutoff pentode. The gain of this pentode stage is a function of the bias voltage and as the gain will be low when the signal voltage at the grid is high and vice versa, the output from this stage will be more nearly constant than its input. The time constant of the RC filter is made large so that the bias voltage at the grid of tube 71 will not be affected by any sudden change in signal level. The automatic gain control is of the forward acting type rather than back acting type in order to obtain a more nearly constant output.

In order to secure a larger dynamic range of automatic gain control and to preclude the possibility of distortion due to large signals, two automatic gain control stages are employed. The second stage formed by pentode 80, diode 81 and RC filter 82 is fed from the first stage via a triode 83 acting as a cathode follower and performing as an isolating stage between the two automatic gain control stages. The output from the pentode 80 will be nearly constant with a 32 decibel change in signal at the input of the pentode 71 causing less than one decibel change at the plate of the pentode 80.

Figure 1E:
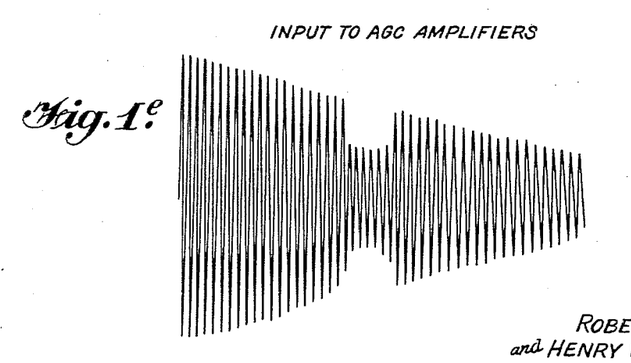
Figure 1F:
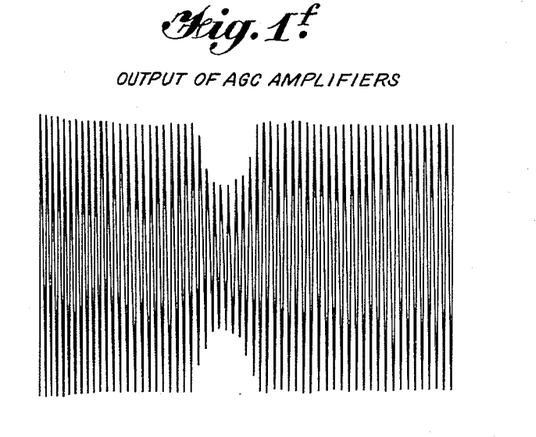
Figure 1G:
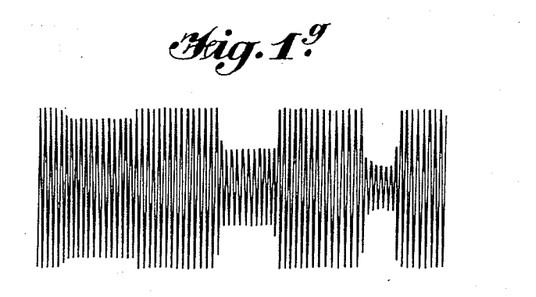
Figure 1H:
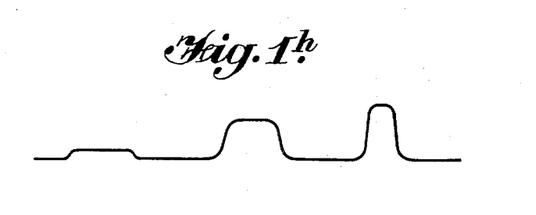
Figure 1I:
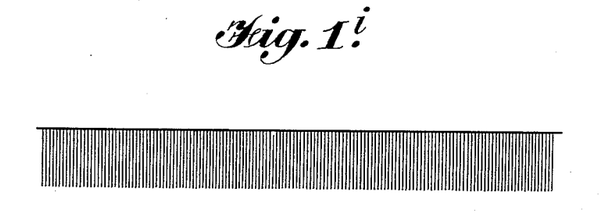
Figure 1J:
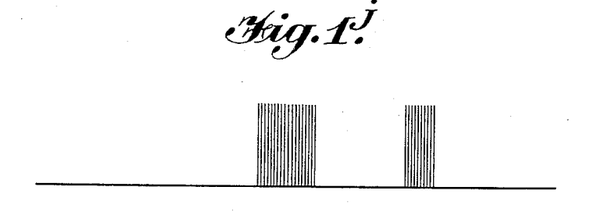

At the output of the pentode 80 the signal wave form from the playback head is substantially unchanged with the exception that the ambient signal level has been made substantially constant. Any higher frequency transients are still relatively unchanged as shown in Figures 1e and 1f which illustrate wave forms corresponding to the signal level at the input to the automatic gain control amplifiers and at the output of the automatic gain control amplifiers respectively. It will be noted that a dropout illustrated in the input signal of Figure 1e is still present in the output signal of Figure 1f.

It is the intention of the invention to detect dropouts, but only if the dropouts exceed a predetermined limit in amplitude and duration. For this purpose, a comparator circuit is utilized which consists of a crystal rectifier 85 which receives the output from pentode 80 through a condenser 86. The signal is rectified and filtered in the circuit composed of resistors 87 and 88 and condenser 89. The time constant of the filter is such that if the input signal at the cathode of the crystal rectifier 85 is suddenly reduced 6 decibels, it will take the voltage across the condenser 89 an amount of time equivalent to 20 cycles of the signal voltage (4,000 c.p.s. signal) to change 6 decibels. Thus, a dropout of 20 cycles duration is the minimum which can be detected. The bias voltage developed across the condenser 89 is also the plate voltage of a reference diode 90. Negative pulses of very short duration and occurring at a repetition rate of 4000 per second are applied to the cathode of diode 90 through the secondary of transformer 92. When the pulses on the cathode of diode 90 exceed the negative plate voltage the diode 90 will conduct and the pulses will be coupled to the grid of pentode 94 through the capacitor 95.

The circuitry associated with diode 90 and pentode 94 comprises a conventional comparator circuit for producing pulses at the plate of pentode 94. The grid bias of pentode 94 is approximately zero because of the positive grid return, thus the tube is conducting. When the negative pulses on the cathode of diode 90 are of slightly greater amplitude than the negative plate voltage, this small negative voltage will appear at the grid of pentode 94. The small negative voltage appearing at the grid of pentode 94 will cause the plate current to be reduced slightly, and since the primary of transformer 92 is located in the cathode circuit of pentode 94, this will cause an increased negative voltage to appear at the grid of pentode 94. This regenerative action produces a pulse at the plate of pentode 94, the pulse duration and shape being primarily determined by transformer 92. All pulses produced at the plate of pentode 94 will be uniform regardless of the amplitude of the pulses at the grid of pentode 94 which initiates the action.

It is seen that the amplitude of the pulses at the cathode of diode 90 determines if a drop-out will be detected. The amplitude of the pulses can be varied so that drop-outs of varying severity may be detected.

If a drop-out occurs in the signal from the automatic gain controlled amplifier stages, a burst of pulses will be generated at the plate of pentode 94. The number of pulses will correspond to the length of the drop-out. Figure 1g to 1j inclusive, show the waveforms at the output of the AGC amplifier (tube 80), plate of diode 90, cathode of diode 90, and plate of pentode 94 respectively. It is now desirable to convert the group of pulses at the plate of pentode 94 into a single signal pulse whose width will be equivalent to the width of the group of pulses.

Figure 1K:
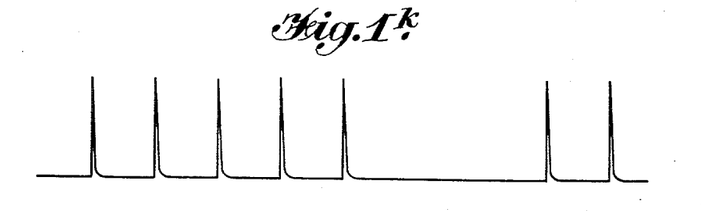
Figure 1L:
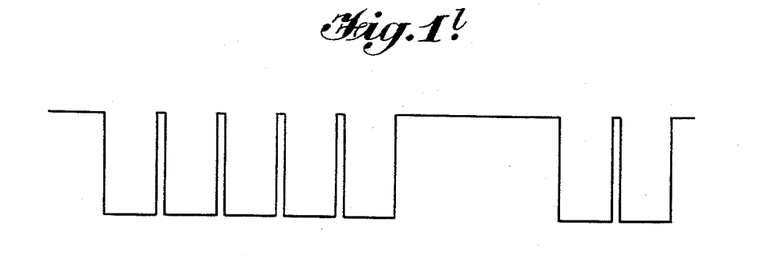

The narrow pulses occurring at the plate of pentode 94 are capacitor coupled to a trigger tube 98 and used to trigger a one-shot multivibrator composed of tubes 96 and 97, and associated circuitry. The multivibrator is a conventional one-shot multivibrator employing the parallel trigger tube 98. The trigger pulses from pentode 94 and the asymmetrical output of tube 97 are shown in Figures 1k and 1l respectively. The output from tube 97 is fed via condenser 99 to a cathode follower 100.

Figure 1M:
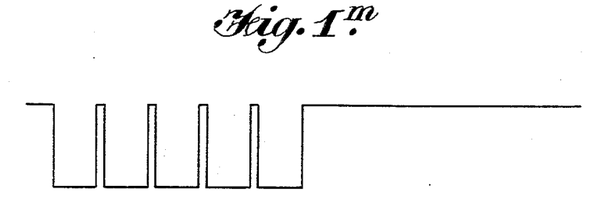
Figure 1N:
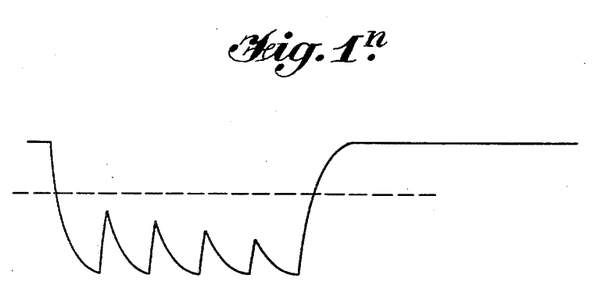

The output from cathode follower 100 is fed through coupling capacitor 102 to a clamping circuit. The diode 104 clamps the signal at ground potential and converts the signal to a negative going signal according to the waveform as shown in Figure 1m. During the negative excursion of the signal, capacitor 106 charges through resistor 108 and the forward resistance of the diode 110 and discharges through the back resistance of diode 110 during the positive going portion of the signal. The time constant of the discharge circuit is high enough to prevent capacitor 106 from becoming completely discharged during the positive portion of the signal, but at the same time is small enough so that capacitor 106 can discharge very quickly when the train of pulses from the multivibrator ceases. Figure 1n shows the waveform of the voltage developed across capacitor 106. The dotted line in Figure 1n shows the point at which clipping takes place in a clipper-amplifier which follows the clamping circuit.

Figure 1O:
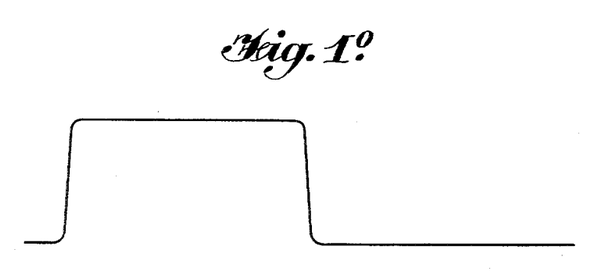

The voltage developed across capacitor 106 is applied to the grid of a clipper-amplifier tube 112. The clipper-amplifier 112 clips the signal at the point which is shown in Figure 1n and the inverted amplified voltage appears at the plate of tube 112 as a positive going rectangular wave as shown in Figure 1a. A neon lamp 114 is used to provide a visual indicator of a drop-out. Coupling to the grid of a recorder driver tube 116 is achieved through capacitor 118. Tube 116 is the driver-amplifier for a second pen motor of the brush recorder previously mentioned. This stage is designed to present the correct input impedance to the recorder. The pen motor of the recorder is connected in series with the cathode circuit of tube 116 as indicated by the reference numeral 120 and legend appearing on Figure 2b of the drawings.

The recording signal for the test apparatus is a symmetrical rectangular waveform of current, approximately 3 milliamperes peak to peak as shown in Figure 1a. The circuits that generate this signal are described below.

A multivibrator composed of tubes 130 and 132 and associated circuitry is arranged to be of the free-running plate-coupled type. The output is a symmetrical rectangular wave whose frequency is approximately 4000 c.p.s. The output from the cathode of tube 132 is directly coupled into a shaper tube 134 connected as a grounded grid clipper-amplifier. This stage clips and amplifies the signal from tube 132 so that a very nearly rectangular wave exists at the plate of tube 134. The output of tube 134 is coupled through capacitor 136 to the grid of a cathode follower 138. Tube 138 is a modified cathode follower whose function is to provide a low impedance drive for the recording head driver tube 140. The output from the cathode follower 138 is fed directly to the grid of the recording head driver tube 140. The large amplitude signal present at the plate of tube 140 is coupled through capacitor 142 and resistor 144 to the recording head which connects to terminal 146. The time constant of this circuit is very small and the current through the recording head will be very nearly rectangular.

It was stated before that negative pulses are present at the cathode of diode 90 and that the amplitude of these pulses can be varied to ascertain the severity of the drop-out. The circuits that perform these functions are described below. A rectangular wave output is taken from cathode follower 138 and applied to the grid of tube 150 via condenser 152. The plate load of tube 150 is the primary of a pulse transformer 154. This transformer 154 is designed to pass a signal only a few micro-seconds wide and as a result the signal at the grid of tube 150 is differentiated in the transformer 154. Although there are both negative and positive pulses on the cathode of diode 90, the positive pulses are of no consequence.

Resistors 156, 158, 160, 162, 164, 166, and switch 168 are used to set the signal levels at the cathode of diode 90, 5, 6, 8, 10 and 12 db below the level of the signal at the secondary of transformer 154. Thus, if switch 168 connects resistors 160 and 156 in series across the secondary of transformer 154, and if the amplitudes of the voltages at the outputs of the AGC amplifier and secondary of transformer 154 are equal, then the signal level at the output of the AGC amplifier must drop by more than 6 db to produce an output at tube 98. Resistors 170 and 172 control the amplitude of the signal appearing across the primary of transformer 154. The means by which this voltage is made equal to the voltage developed at the output of the AGC amplifier and thereafter calibrated to a preselected dropout is described below.

The signal level at transformer 154 and the output of the AGC amplifiers are adjusted to the same amplitude by setting switch 168 in the 6 db position and introducing an artificial signal into the input of the playback amplifier. The amplitude of this signal can be decreased accurately by 6 db to create a drop-out and resistors 170 and 172 adjusted until tube 94 is on the threshold of operation. The artificial signal and drop-out are produced by the circuits described below. The signal introduced into the input of the playback amplifier is a sine wave whose frequency is approximately 4000 c.p.s.

Tube 180 and associated circuitry form a phase shift oscillator. In order to prevent loading in the plate circuit by the phase shifting networks, the signal from the plate of tube 180 is fed through a capacitor 181 to a cathode follower 182 whose output feeds the phase shifting networks, generally designated by the numeral 184. This type of phase shift oscillator has excellent high frequency characteristics and also provides a low impedance input to a 6 db calibrator circuit.

When switch 200 is in the calibrate position contacting terminal 192, a signal is developed across resistor 186 and the input to the playback amplifier by means of line 194. Condenser 188, resistor 190 and resistor 186 are chosen so that the signal developed across resistor 186 is comparable to the average signal from a recording element. Resistor 196 connected in shunt with switch 200 is selected to reduce the signal across resistor 186 by 6 db when the normally closed switch 200 is opened by contacting terminal 198, thereby creating a 6 db dropout at the input to the playback amplifier. It should be noted that if switch 200 remains open the AGC amplifiers will return the signal at the output of the AGC amplifier to the normal level. Switch 200 should be opened and closed as rapidly as possible.

Although the invention has been shown and described with reference to a preferred embodiment, nevertheless, various changes and modifications obvious to one skilled in the art are deemed to be within the spirit, scope and contemplation of the invention in its broadest terms.

What is claimed is:

Method for testing a magnetically permeable recording element which includes the steps of electrically generating a constant amplitude, constant frequency signal, magnetically recording said signal on a magnetically permeable recording element, reproducing a play-back signal from said recording element, electrically detecting the level of said play-back signal whereby the general condition of said recording element is determined, visually recording the detected level of said play-back signal, electrically comparing said signal and said play-back signal to determine the presence of a drop out in said play-back signal which exceeds a preselected value and which persists for a predetermined duration whereby distortions of short duration introduced into the play-back signal by defects in the recording element are determined, and visually recording the presence of a drop out in said play-back signal.

References Cited in the file of this patent

UNITED STATES PATENTS

| | | |
|---|---|---|
| 2,528,290 | Wiegand | Oct. 31, 1950 |
| 2,536,892 | Sinnett et al. | Jan. 2, 1951 |
| 2,561,466 | Gahagan | July 14, 1951 |
| 2,628,346 | Burkhart | Feb. 10, 1953 |
| 2,685,772 | Proctor | Aug. 10, 1954 |
| 2,711,509 | Endres et al. | June 21, 1955 |
| 2,793,344 | Reynolds | May 21, 1957 |
| 2,813,259 | Burkhart | Nov. 12, 1957 |
| 2,817,829 | Lubkin | Dec. 24, 1957 |